United States Patent

[11] 3,550,967

| [72] | Inventor | Roger G. Caron |
| --- | --- | --- |
| | | 148 High St., Sanford, Maine 04073 |
| [21] | Appl. No. | 880,635 |
| [22] | Filed | Nov. 28, 1969 |
| | | Division of Ser. No. 681,783, Nov. 9, |
| | | 1967, Patent No. 3,481,416. |
| [45] | Patented | Dec. 29, 1970 |

[54] SNOW VEHICLE TRACK ASSEMBLY
7 Claims, 4 Drawing Figs.

[52] U.S. Cl..................................................... 305/27,
305/35
[51] Int. Cl..................................................... B62d 55/14
[50] Field of Search........................................ 305/23, 27,
28, 35, 56; 180/9.5, 5, 9.2

[56] References Cited
UNITED STATES PATENTS

| 2,698,667 | 1/1955 | Kropp.......................... | 180/9.2 |
| --- | --- | --- | --- |
| 2,786,725 | 3/1957 | Thorne......................... | 305/23X |
| 3,019,061 | 1/1962 | Schomers..................... | 305/35X |
| 3,275,387 | 9/1966 | Hedges......................... | 305/27 |
| 3,412,821 | 11/1968 | Humphrey.................... | 180/5 |

Primary Examiner—Richard J. Johnson
Attorney—Clarence A. O'Brien and Harvey B. Jacobson ABSTRACT: A crawler tread and support assembly including a plurality of aligned wheel assemblies with each assembly including a plurality of axially spaced wheels and an endless track member trained about the wheel assemblies and upon which the lower peripheral portions of the wheels are rollingly engaged. The endless track member includes inwardly projecting and longitudinally spaced V-shaped guide members disposed in planes extending transversely of the endless track member and having their apices disposed inwardly of the endless track member and snugly received between the adjacent wheels of each set of wheel assemblies.

PATENTED DEC 29 1970

3,550,967

Roger G. Caron
INVENTOR.

BY Clarence A. O'Brien
and Harvey B. Jacobson
Attorneys

SNOW VEHICLE TRACK ASSEMBLY

This application comprises a division of my copending U.S. application Ser. No. 681,783, for "Snow Vehicle," filed Nov. 9, 1967, now U.S. Pat. No. 3,481,416.

The track assembly of the instant invention has been designed primarily for use in snow although it is readily capable of traveling over hard ground and mud. The track assembly includes a lower reach of considerable length with which three longitudinally spaced roller assemblies are rollingly engaged and the roller assemblies each include three axially spaced wheels. The center roller assembly is supported from the crawler tread assembly for adjustable vertical positioning whereby when the vehicle is to be utilized for transportation over rough ground surfaces not covered with snow the center portion of the lower reach of the endless track portion may be upwardly displaced between the front and rear roller assemblies, when the center roller assembly is in an elevated position.

The track assembly includes a main frame provided with an upper mounting portion whereby the entire track assembly may be mounted for oscillation about a horizontal transverse axis elevated above the upper reach of the endless track portion of the assembly.

In addition, the individual rollers or wheels of the roller assemblies are pneumatic and the endless tread assembly entrained about the roller assemblies includes novel means by which the endless crawler tread is maintained properly trained about the support wheels or rollers.

The main object of this invention is to provide an endless track assembly which is particularly well adapted for travel over ground surfaces having a deep snowfall thereon as well as clear paved and nonpaved ground surfaces.

Another object of this invention, in accordance with the immediately preceding object, is to provide an endless track assembly including an endless track structure trained about a plurality of longitudinally spaced roller or wheel assemblies each including a plurality of axially spaced wheels or rollers and with the endless track including means coacting with the various axially spaced rollers or wheels in a novel manner maintaining the endless track or tread properly trained about the support rollers or wheels.

Yet another object of this invention is to provide an endless track assembly particularly well adapted for use in traveling over snow covered surfaces but which may be readily modified, merely by adjustment, for use in traveling over various ground surfaces not covered with snow.

A final object of this invention to be specifically enumerated herein is to provide an endless track assembly in accordance with the preceding objects which will conform to conventional forms of manufacture, be of simple construction and easy to service so as to provide a device that will be economically feasible, long lasting and relatively trouble free in maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
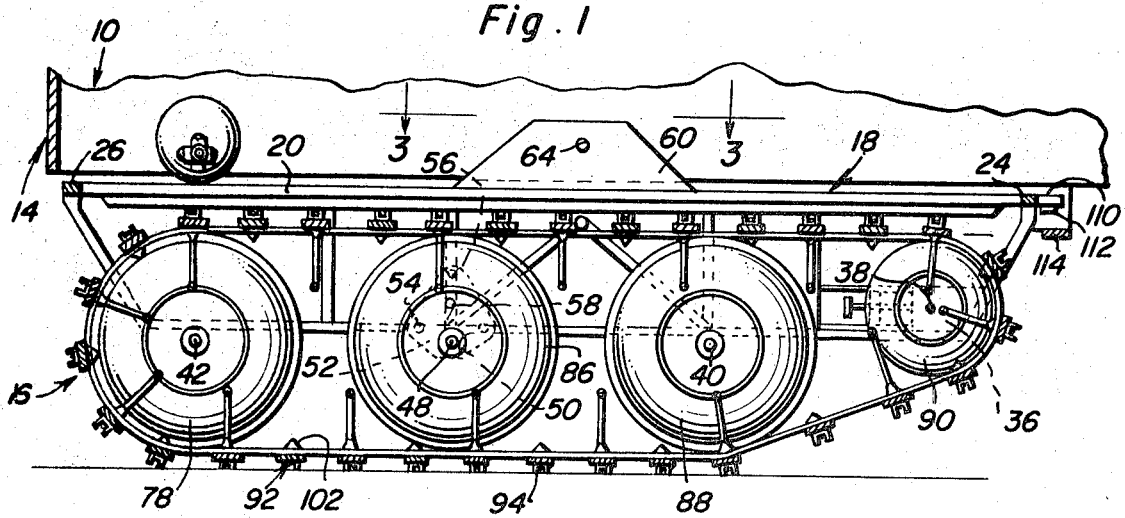
FIG. 1 is a fragmentary longitudinal vertical sectional view taken substantially upon a plane passing through the longitudinal center line of the endless track assembly.
Figure 2:
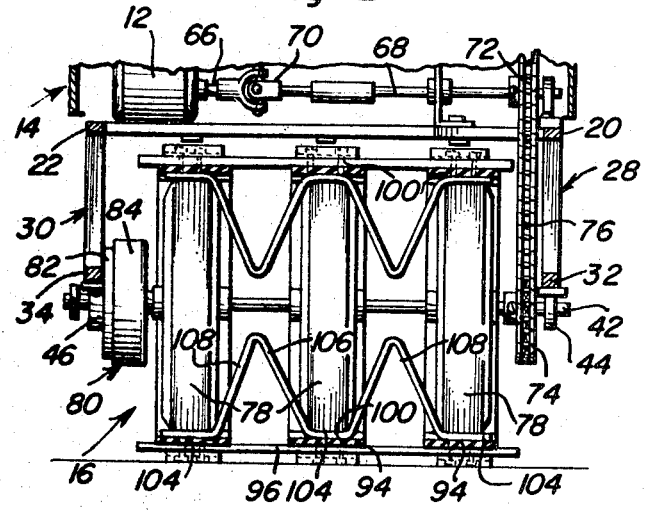
FIG. 2 is a transverse vertical sectional view taken substantially upon a plane passing through the axis of rotation of the left-hand wheel assembly illustrated in FIG. 1.
Figure 3:
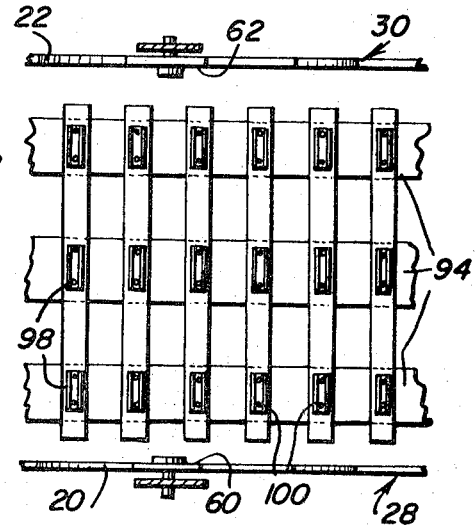
FIG. 3 is a fragmentary horizontal sectional view taken substantially upon the plane indicated by the section line 3—3 of FIG. 1.

Referring now more specifically to the drawings the numeral 10 generally designates a snow vehicle including a motor driven transmission 12 inclosed within a body assembly 14 of the vehicle 10.

The track assembly of the instant invention is referred to in general by the reference numeral 16 and includes a main frame generally referred to by the reference numeral 18 consisting of a pair of opposite side longitudinal members 20 and 22 interconnected by means of front and rear transverse members 24 and 26. The longitudinal members 20 and 22 comprise the upper longitudinal members of a pair of opposite side truss assemblies referred to in general by the reference numerals 28 and 30 including lower longitudinal members 32 and 34, respectively. The truss assemblies 28 and 30 include longitudinally adjustable front bearing blocks 36 from which the opposite ends of a front transverse shaft 38 are journaled. The bearing blocks 36 are adjustably positionable longitudinally of the truss assemblies 28 and 30 by means of corresponding adjusting screws 38 and a pair of front and rear main transverse shafts 40 and 42 are journaled between the truss assemblies 28 and 30 from bearing blocks 44 and 46 spaced longitudinally along the lower longitudinal members 32 and 34. Further, the opposite ends of a center main transverse shaft 48 are journaled in bearings 50 mounted on opposite side support plates 52 and each support plate 52 is supported from the corresponding lower longitudinal member by means of pivot fasteners or pins 54 and retained in adjusted position by means of removable fasteners 56 and 58. The support plates 52 are oscillatable between the positions thereof illustrated in FIGS. 1 and 4 of the drawings and it may be seen that when the plates are oscillated from the positions thereof illustrated in FIG. 1 of the drawings to the positions illustrated in FIG. 4 of the drawings the shaft 48 is elevated appreciably above the position thereof illustrated in FIG. 1 of the drawings.

The main frame 18 includes a pair of opposite side upstanding mounting plates 60 and 62 whose upper portions are oscillatably supported from the body 14 for swinging about aligned axes defined by pivot fasteners 64 which secure the mounting plate 60 to the opposite side portions of the body 14. Further, the motor driven transmission 12 is supported from the main frame 18 and includes an output shaft 66 which is coupled to a drive shaft 68 through a universal joint 70. The end of the drive shaft 68 remote from the transmission 12 includes a drive sprocket wheel 72 and the corresponding end of the shaft 42 includes a driven sprocket wheel 74 aligned with the sprocket wheel 72 and driven from the latter through an endless chain 76.

A plurality of axially spaced pneumatic wheels 78 are mounted on the shaft 42 for rotation therewith and the end of the shaft 42 remote from the sprocket wheel 74 has a brake assembly generally referred to by the reference numeral 80 operatively associated therewith. The assembly 80 includes a backing plate assembly 82 which is supported from the truss assembly 30 and a brake drum portion 84 carried by the rear shaft 42 for rotation therewith. Accordingly, the brake assembly 80 may be actuated in any suitable manner so as to brake the shaft 42 and thus the wheels 78.

The shaft 48 has three axially spaced pneumatic wheels 86 journaled thereon which are aligned with the wheels 78 and the front main transverse shaft 40 has three axially spaced wheels 88 journaled thereon which are also aligned with the wheels 78. Finally, the front transverse shaft 38 includes three axially spaced pneumatic wheels 90 mounted thereon registered with the wheels 88.

An endless track assembly is generally referred to by the reference numeral 92 and includes three endless flexible belt members 94 interconnected by means of a plurality of wooden connecting members 96 spaced about and extending transversely of the assembly 92. The connecting members 96 are spaced about the outer surfaces of the belts 94 and each has three channel-shaped cleats 98 secured thereto. The channel-shaped cleats 98 are secured to the connecting members 96 by means of fasteners 100 secured through the cleats 98, the connecting members 96 and the belts or belt members 94.

Every other connecting member 96 has three inner V-shaped cleats 102 mounted thereon to which the inner ends of the corresponding fasteners 100 are anchored. The V-shaped cleats 102 are of course mounted on the inner surface portions of the belts 94 and the inner ends of the fasteners 100 disposed between pairs of adjacent connecting members 96 to which the V-shaped cleats 102 are secured are carried by aligned mounting portions 104 of W-shaped or double V-shaped guide structures 106. Each guide structure 106 includes a pair of transversely aligned V-shaped portions 108 which project inwardly between a pair of adjacent wheels or rollers 78 and therefore provides double guiding surfaces preventing lateral shifting of the endless track assembly 92 in each direction transversely of the vehicle 10.

The rear shaft 42 is drivingly connected to the endless track assembly 92 not only through contact of the peripheral portions of the wheels 78 with the cleats 102 and aligned mounting portions 104 as well as the inner surfaces of the belts 94, but also the divergent legs of each of the V-shaped portions 108.

The forward end of the frame 18 includes opposite side extension arms 110 having resilient pads 112 secured to the undersurfaces of their forward ends. The pads 112 are engageable with inturned flange portions 114 carried by the body 14 to limit downward swinging movement of the forward end of the track assembly 16. Also, it is to be understood that the transmission 12 is to be driven by any suitable prime mover (not shown) also supported from the main frame 18 and oscillatable therewith.

Figure 4:
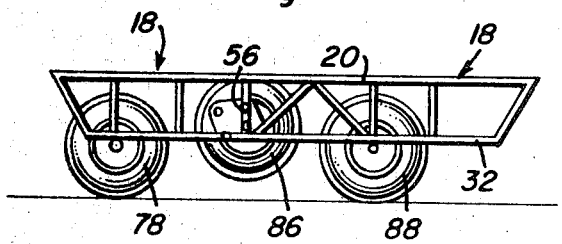
FIG. 4 is a schematic side elevational view of the crawler tread assembly illustrating the manner in which the center wheel or roller means may be vertically raised so as to adapt the crawler tread assembly for use over rough ground surfaces not having snow thereon.

With attention now invited more specifically to FIG. 4 of the drawings it may be seen that the wheels 86 may be upwardly displaced by removing the fasteners 56 and 58 and swinging the plates 52 from the positions thereof illustrated in FIG. 1 of the drawings to the positions thereof illustrated in FIG. 4 of the drawings, in which positions the fasteners 56 may be utilized to retain the plates 52 against oscillation relative to the truss assemblies 28 and 30. By shifting the bearing blocks 36 rearwardly the endless track assembly 92 may be untensioned so as to be capable of being upwardly displaced over the wheels 78 after the latter have been elevated. Then, the lower reach of the endless track assembly 92 may be deflected upwardly between the wheels 78 and 88 during movement of the track assembly 16 over rough ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. For use on a snow vehicle, a crawler tread support and drive assembly comprising an elongated frame structure adapted to extend longitudinally of said vehicle and including an endless track member and a plurality of wheel means spaced longitudinally of said structure and journaled therefrom for rotation about axes extending transversely thereof about which said endless track member is entrained, said frame structure including opposite side pivot axis defining means adapted to support said frame structure from the remainder of said vehicle for oscillation about a horizontal axis extending transversely of said vehicle and frame structure, said wheel means including front and rear wheel assemblies spaced longitudinally along said frame structure and a single intermediate wheel assembly spaced between said front and rear assemblies under which the lower reach of said track member extends, the intermediate wheel assembly being supported from said support frame structure for vertical adjustable positioning between a lowered position with its lower periphery generally horizontally aligned with the lower peripheries of the front and rear wheel assemblies and an upper position with its lower periphery spaced sufficiently above the lower peripheries of said front and rear wheel assemblies to enable the lower reach of said track member to be upwardly deflected between said front and rear wheel assemblies when the latter are disposed on opposite sides of a rise over which said track member extends, said pivot axis being spaced above and in a vertical transverse plane disposed between said front and rear wheel assemblies.

2. The combination of claim 1 wherein said endless track member includes a plurality of laterally spaced endless track elements interconnected by transversely extending members spaced longitudinally along said track member, said wheels being rollingly engaged with said endless track elements.

3. The combination of claim 1 wherein said wheel means includes a smaller diameter idle wheel assembly journaled from the forward end portion of the frame structure forward of the front wheel assembly and about which said endless track member is also entrained, the lower peripheral portions of said idle wheel assembly being elevated appreciably above the lower peripheries of said front and rear wheel assemblies, and said idle wheel assembly being adjustably shiftable longitudinally of said frame structure for adjustably tensioning said endless track member.

4. For use on a snow vehicle, a crawler tread support and drive assembly comprising an elongated frame structure extending longitudinally of said vehicle including an endless track member and a plurality of wheel means spaced longitudinally of said structure and journaled therefrom for rotation about axes extending transversely thereof about which said endless track member is entrained, said wheel means including a plurality of journaled wheel assemblies spaced longitudinally along said frame structure, each of said wheel assemblies including the axially spaced and aligned wheels, said endless track member including three laterally spaced endless flexible belts each entrained about one set of corresponding wheels of said assemblies, a plurality of elongated generally parallel connecting members spaced longitudinally along and extending transversely of said track members, said connecting members extending between and being secured to corresponding outer surface portions of said belts, and pairs of coplanar V-shaped guide members including divergent legs joined at their adjacent ends and spaced about, secured to and projecting inwardly of said belts with the free ends of the remote legs of said guide members secured to the outer belts and the free ends of the adjacent legs of said guide members secured to the center belt, the outside wheels of each assembly passing outwardly of said remote leg free ends and the center wheel of each wheel assembly passing between the adjacent leg free ends, whereby coaction between two wheels of each of said wheel assemblies and two corresponding legs of each pair of V-shaped guide members will prevent shifting of the track member axially of the axes of rotation of said wheel assemblies in each axial direction.

5. The combination of claim 4 wherein said wheels of the rearmost wheel assembly are mounted for rotation in unison, and drive means supported from said frame structure and drivingly connected to the wheels of the rearmost wheel assembly, said drive means including power input means adapted to be driven by a suitable prime mover.

6. The combination of claim 4 wherein each of said connecting members has three cleats secured to the outer surface portions thereof at points spaced longitudinally therealong registered with the wheels of said wheel assemblies.

7. The combination of claim 6 wherein said endless track member includes a second set of elongated generally parallel connecting members spaced longitudinally therealong and extending transversely of said track members with each of the connecting members of the second set of connecting members disposed between an adjacent pair of the first mentioned connecting members, the second set of connecting members extending between and being secured to corresponding outer surface portions of said belts, and inner cleats secured to the inner surfaces of said belts at points spaced longitudinally therealong registered with the second set of connecting members.